(12) United States Patent
Rasmussen

(10) Patent No.: US 7,935,743 B1
(45) Date of Patent: May 3, 2011

(54) ELECTRICALLY DRIVEN MECHANOCHEMICAL ACTUATORS THAT CAN ACT AS ARTIFICIAL MUSCLE

(75) Inventor: Lenore Rasmussen, Hillsborough, NJ (US)

(73) Assignee: Lenore Rasmussen, Hillsborough, NJ (US)

( * ) Notice: Subject to any disclaimer, the term of this patent is extended or adjusted under 35 U.S.C. 154(b) by 1243 days.

(21) Appl. No.: 11/478,431

(22) Filed: Jun. 30, 2006

Related U.S. Application Data

(60) Provisional application No. 60/699,661, filed on Jul. 6, 2005.

(51) Int. Cl.
*A61F 2/08* (2006.01)
*H02K 33/00* (2006.01)

(52) U.S. Cl. .............. 523/113; 310/15; 310/17; 427/58; 524/916

(58) Field of Classification Search ................... 428/67; 427/58; 310/15; 524/916; 523/113
See application file for complete search history.

(56) References Cited

U.S. PATENT DOCUMENTS

| | | | |
|---|---|---|---|
| 4,328,148 A | 5/1982 | Kuzma | |
| 5,100,933 A | 3/1992 | Tanaka | |
| 5,311,223 A | 5/1994 | Vanderlaan | |
| 5,389,222 A | 2/1995 | Shahinpoor | |
| 5,630,709 A | 5/1997 | Bar-Cohen | |
| 5,736,590 A | 4/1998 | Rasmussen | |
| 5,961,298 A | 10/1999 | Bar-Cohen | |
| 5,977,685 A | 11/1999 | Kurita | |
| 6,109,852 A | 8/2000 | Shahinpoor | |
| 6,376,971 B1 | 4/2002 | Pelrine | |
| 6,413,676 B1 * | 7/2002 | Munshi | 429/306 |
| 6,475,639 B2 | 11/2002 | Shahinpoor | |
| 6,543,110 B1 | 4/2003 | Pelrine | |
| 6,545,384 B1 | 4/2003 | Pelrine | |
| 6,583,533 B2 | 6/2003 | Pelrine | |
| 6,586,859 B2 | 7/2003 | Kornbluh | |
| 6,589,198 B1 | 7/2003 | Soltanpour | |
| 6,628,040 B2 | 9/2003 | Pelrine | |
| 6,664,718 B2 | 12/2003 | Pelrine | |
| 6,682,500 B2 | 1/2004 | Soltanpour | |
| 6,707,236 B2 | 3/2004 | Pelrine | |
| 7,026,054 B2 * | 4/2006 | Ikegawa et al. | 428/457 |
| 7,177,140 B2 * | 2/2007 | Clarke et al. | 361/521 |
| 2003/0156953 A1 * | 8/2003 | Chinn et al. | 417/322 |
| 2003/0170308 A1 * | 9/2003 | Cleary et al. | 424/486 |

FOREIGN PATENT DOCUMENTS

| | | | |
|---|---|---|---|
| JP | 357042139 A | * | 3/1982 |
| WO | WO 01/06579 A2 | | 1/2001 |

OTHER PUBLICATIONS

Ashley, S., "Artificial Muscles," Sci. Amer. [2003], 289 (4), 52-59.
Pelrine, R., et al., "Dielectric Elastomeric Artificial", Proceedures of SPIE [2002], 126-137.
Tanaka, T., et al, "Collape of Gels on Electric Field," Science [1982], 218(4571), 467-469.
Tanaka, T., "Molecular Dynamics of Multi . . . " AIP Conference Proceedings [1999],469.
English, A., et al, "Polymers & Solutions Ion . . . " Polymer [1998], 39(24), 5893-5897.
Shiga, T., "Bending of a High Strength Polymer", Polymer Preprints [1989] 30(1), 310-314.
Kuragchi, T., "Deformation Behavior . . . " in "Polymer Gels" [1991], 237-246.
Osada, Y., "Conversions of Chemical Info . . . " Advances in Polymer Science, [1987], 82, 3-46.
Chen, L., et al, "Water Swollen Hydrogels . . . " Macromol. Chem. Phy. [2003], 204(4), 661-665.
Osada, Y., "Electrical Behavoirs . . . ", in "Polymer Gels", [2002], 177-217.
Osada, Y., "Intelligent Gels," Materials Research Soc. Symp. Proc., [2000], 604, 149-159.
Osada, Y., "Chemical Valves and Gel Actuators," Advanced Materials, [1991], 314, 107-108.
Shah Inpoor, M., "Ionic Polymer . . . " Electrochimica Acta, [2003], 48, 2343.

* cited by examiner

*Primary Examiner* — Tae H Yoon

(57) ABSTRACT

This invention describes an electrically driven mechanochemical actuator comprising an electroactive material capable of converting electrical to mechanical energy in communication with a first electrode and a second electrode, the electroactive material immersed in an electrolyte, the electroactive material and electrolyte surrounded by a flexible encapsulating coating, wherein a portion of the first electrode and a portion of the second electrode penetrate there through.

2 Claims, 2 Drawing Sheets

ELECTRICALLY DRIVEN MECHANOCHEMICAL ACTUATORS THAT CAN ACT AS ARTIFICIAL MUSCLE

This application claims the benefit of Provisional Application No. 60/699,661, filed on Jul. 6, 2005.

TECHNICAL FIELD OF THE INVENTION

This invention relates to materials or configurations that respond to electricity, converting electrical energy into mechanical energy in the form of movement, specifically, to materials or configurations that act as electrically driven mechanochemical actuators, in essence, acting as artificial muscle.

BACKGROUND OF THE INVENTION

There has been a great deal of interest in the search for materials that can transfer electrical energy directly into mechanical energy, analogous to the physiology of muscles converting electrical and chemical energy into mechanical energy to produce movement. Advances in these endeavors have been achieved around the world, using materials such as poly(vinyl alcohol), ionized poly(acrylamide), poly(acrylic acid), poly(acrylic acid)-co-(poly(acrylamide), poly(2-acrylamide-2-methyl-1-propane sulfonic acid), poly(acrylic acid), poly(methacrylic acid), poly(styrene sulfonic acid), quarternized poly(4-vinyl pyridinium chloride), and poly(vinylbenzyltrimethyl ammonium chloride), to name a few. SRI International holds patents in this area (U.S. Pat. Nos. 6,707,236, 6,664,718, 6,628,040, 6,586,839, 6,583,533, 6,545,384, 6,376,971, 6,543,110), as well as the Nippon Zeon Corporation and the Nitta Corporation (U.S. Pat. No. 5,977,685). Piezoelectric materials have also been investigated for use as electrically responsive materials; however, most piezoelectric materials undergo length changes of only a fraction of one percent.

Another area of research has been electronic electroactive polymers. Ron Pelrine, et al, at SRI International, has produced electrically driven mechanochemical actuators, where the electric field is applied through flexible carbon plates, which provide for an expandable conducting surface, and an elastomeric material is sandwiched between the carbon plates (Pelrine, R. E., Kornbluh, R. D., Pei, Q., Oh, S., Joseph, J. P., "Electroactive polymers and their use in devices for conversion of electrical to mechanical energy," U.S. Pat. No. 6,376,971 B1 [2002], WO Patent 2001006579 A2 [2001]). The elastomeric material wedged between the carbon plates acts as a flexible, movable structure when the two carbon plates, with opposing charges, are attracted and move closer to each other for the duration of the electric impulse. When the electric field is turned off, the smart material resumes its previous configuration. A good overview of electronic electroactive polymers is discussed in Scientific American, "Artificial Muscles," [2003], 289(4), 52-59 and in the Proceedings of SPIE (4695), "Dielectric Elastomer Artificial Muscle Actuators: Toward Biomimetric Motion," [2002], Smart Structures and Materials 2002: EAPAD, Ed.: Bar-Cohen, Y., 126-137.

The predominant research of SRI International, Mohsen Shahinpoor, and Yoseph Bar-Cohen are examples of electronic electroactive polymers; however, electronic electroactive polymers typically require high voltages, and once the configuration is reached, the smart material is static.

Another area of research has been ionic electroactive polymers. Toyoichi Tanaka, et al, observed that ionized poly(acrylamide) gels, immersed in 50% acetone and 50% water mixture, collapsed and physically shrunk in the presence of an electric field (Tanaka, T., Nishio, I., Sun, S., Tang; U., "Collapse of gels in an electric field," Science [1982], 218(4571), 467-9). Tanaka has also investigated branched polymers (Tanaka, M., Grosberg, A. Y., Tanaka, T., "Molecular dynamics of multi-chain coulomb polymers and the effect of salt ions," AIP Conference Proceedings [1999], 469 [Slow Dynamics in Complex Systems]) and polyampholytic hydrogels (English, A. E., Tanaka, T., Edelman, E. R., "Polymer and solution ion shielding in polyampholytic hydrogels," Polymer [1998], 39(24), 5893-5897). Tohru Shiga, et al, found that poly(acrylic acid) gels copolymerized with poly(vinyl alcohol) and with poly(acrylamide), exhibited bending deformations in the presence of an electric field (Shiga, T., Polym. Preprints [1989], 3(1), 310-314; Shiga, T., "Polymer Gels" [1991], Plynom. Press, NY, Editor(s): DeRossi, D., 237-246). Yoshihito Osada, et al, published observations of not only types of materials that are responsive to electricity, but also types of materials that are unresponsive to an electric field (Osada, Y., Adv. Poly, Sci. [1987], 82, 3; Chen, L., Gong, J. P., Ohsedo, Y., Osada, Y., "Water-swollen hydrogels with pendant terthiophenes," Macromolecular Chemistry and Physics [2003], 204(4), 661-665; Osada, Y., Gong, J. P., "Electrical behaviors and mechanical responses of polyelectrolyte gels," in "Polymer Gels and Networks" [2002], 177-217. Editor(s): Osada, Y., Khokhlov, A. R., Marcel Dekker, Inc., New York, N.Y.; Osada, Y., Gong, J. P., Narita, T., "Intelligent gels," Materials Research Society Symposium Proceedings [2000], 604 (Materials for Smart Systems III), 149-159). Osada has also developed several actuators that convert electrical energy to mechanical energy by walking and looping movements (Osada, Y., Adv. Mater. [1991], 3(2), 107; Gong, J. P., Osada, Y., "Chemical motors using gel motors," Kagaku to Kogyo (Tokyo) [2000], 53(2), 184-187). Mohsen Shahinpoor has used electrically responsive polymers coupled with springs and other mechanical devices to improve upon electrically responsive actuators (Shahinpoor, M., "Spring-Loaded Polymeric Gel Actuators," U.S. Pat. No. 5,389,222 [1995]). Lenore Rasmussen found that copolymers comprising crosslinked networks of methacrylic acid and 2-hydroxy methacrylate, cross-linked with cross-linking agents such as ethylene glycol dimethacrylate and 1,1,1-trimethylolpropane trimethacrylate, were superior ionic electroactive materials, with tensile strengths well above the tensile strengths of polyacrylamide type materials (Rasmussen, L., "Process for producing an electrically driven mechanochemical actuator," U.S. Pat. No. 5,736,590, [1998]). A good overview of ionic electroactive polymers is described by Mohsen Shahinpoor in Electrochimica Acta, "Ionic Polymer-Conductor Composites as Biometric Sensors, Robotic Actuators, and Artificial Muscles—a Review," [2003], 48(14-16), 2342-2353. As long as the electricity is on, ionic electroactive polymers typically continue to move. A relatively small amount of electricity will cause a response. However, ionic electroactive polymers must be in a wet environment in order to function.

In view of the foregoing, an alternative form of electrically driven mechanochemical actuators is desirable.

SUMMARY OF THE INVENTION

The present invention overcomes the limits and deficiencies of the prior art by providing for a system and method to provide an electrically driven mechanochemical actuator that has much greater than a few percent of elongation when the electrical stimulus is applied, does not require a high voltage to operate, provides for a junction or interface between the electrode and the electroactive material that does not easily become disconnected over time, and allows for removal from submersion in wet environment.

The present invention relates to a device to convert electrical energy to mechanical energy. The device is comprised of an ionic electroactive polymer based material, an electrolyte solution surrounding the electroactive polymer based material, means to encase the ionic electroactive polymer material and the electrolyte solution in an elastomeric "skin", so that the electromechanical actuator is not dependent upon submersion in a liquid environment, and at least two conductive leads in communication with the electroactive polymer based material.

In one aspect, the present invention relates to a device for converting electrical energy to mechanical energy, wherein the device comprises electrodes that have been treated by exposure to a plasma or exposure to electrical etching, or other surface treatments whereby the electrodes have the improved ability to remain in electrical and mechanical communication with the electroactive material during mechanical motion of the electrically driven mechanochemical actuator.

These and other features and advantages of the present invention will be described in the following description of the invention and the associated figures.

BRIEF DESCRIPTION OF THE DRAWINGS

The present invention is illustrated by way of example, and not by way of limitation, in the figures of the accompanying drawings.

Figure 1:
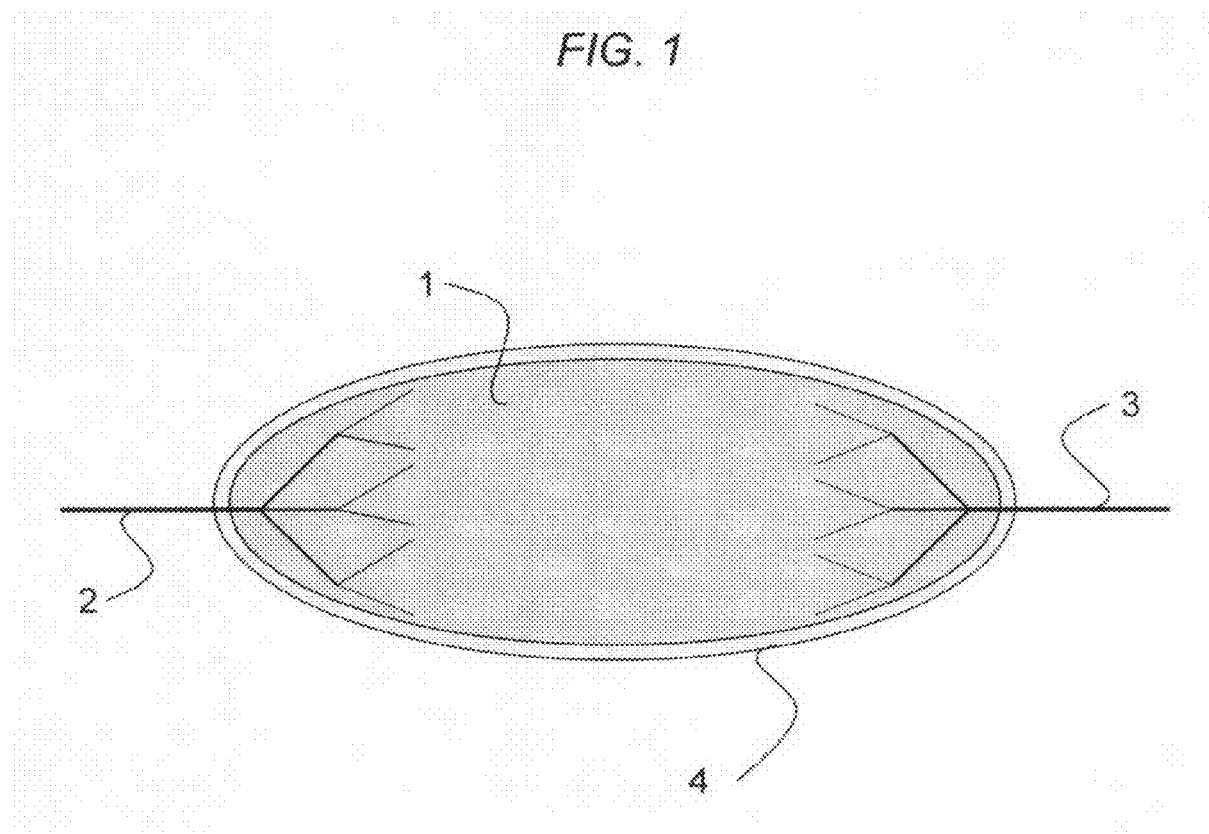
FIG. 1 illustrates the electrically driven mechanochemical actuator with two electrodes.

LIST OF REFERENCE NUMERALS 1 electroactive material
2 first electrode
3 second electrode
4 flexible encapsulating coating
5 electroactive material
6 continuous electrode
7 flexible encapsulating coating

DETAILED DESCRIPTION OF THE PREFERRED EMBODIMENTS

The present invention will now be described in detail, with reference to the preferred embodiments thereof as illustrated in the accompanying drawings. It will be apparent however, to one skilled in the art, that the present invention may be practiced without some of all of these specific details. In other instances, known process steps or structures have not been described in detail in order to not unnecessarily obscure the present invention.

To help describe the performance of the present invention, FIG. 1 illustrates a cross-sectional view of the electrically driven mechanochemical actuator. Electroactive material 1 is in communications with a first electrode 2 and a second electrode 3. Electroactive material 1 is immersed in electrolyte and enclosed by flexible encapsulating coating 4 with electrodes 2 and 3 extending there through.

Figure 2:
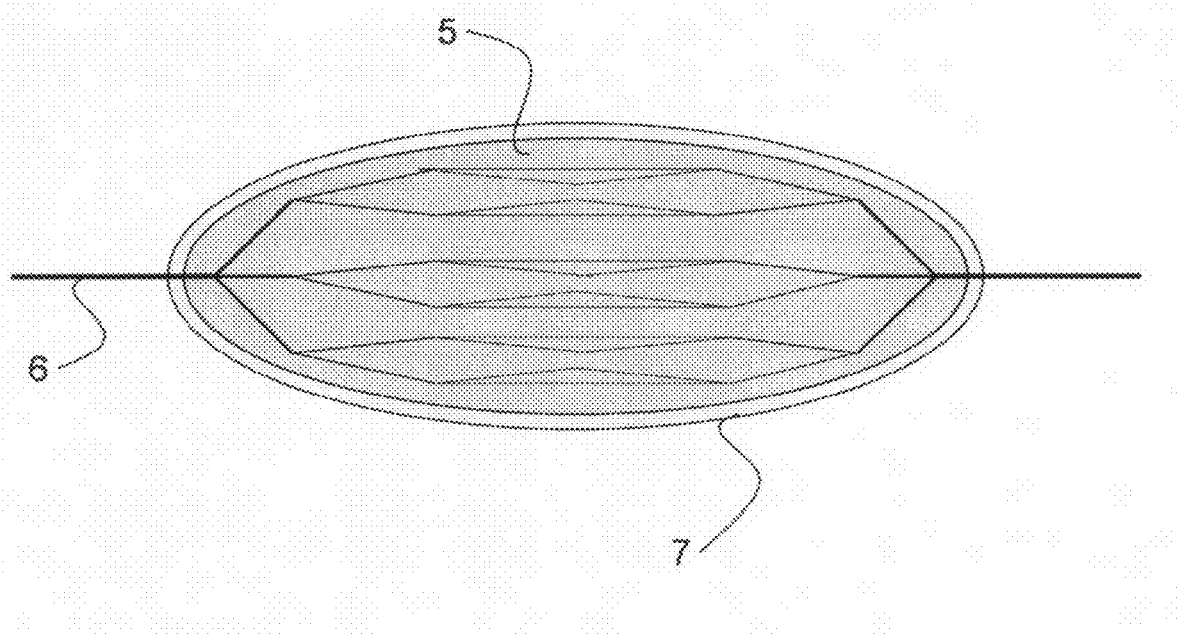
FIG. 2 shows the electrically driven mechanochemical actuator with electrically conductive material such as conductive fibers between the electrodes.

In a second embodiment of the present invention shown in FIG. 2, electroactive material 5 is in communication with a continuous electrode 6, which may comprise a plurality of conductive fibers. The continuous electrode 6, which may comprise a plurality of conductive fibers, is embedded in electroactive material 5 and is in mechanical and electrical communications with continuous electrode 6. The electroactive material 5 is immersed in electrolyte and enclosed by flexible encapsulating coating 7, with the continuous electrode 6 extending there through.

The present invention describes an electrically driven mechanochemical actuator. An ion-containing elastomeric, cross-linked material 1, called a smart material, that responds, by movement, readily to electricity, but also is a tough, resilient material well suited for use, even repetitious use, as an electrically driven mechanochemical actuator. Suitable actuation voltages for the electrically driven mechanochemical actuator may vary based on the material properties, the size of the actuator, and the application.

To help illustrate the performance of the mechanochemical actuator, FIG. 1 shows a cross-sectional view of the actuator. Ion-containing elastomeric, cross-linked materials 1 are also known as electroactive materials, smart materials, intelligent materials, electroactive polymers, or electroresponsive materials. Ion-containing elastomeric, cross-linked materials, may be any ion-containing elastomer. In the present invention, the ion-containing elastomeric, cross-linked material is preferably a polymer composed of methacrylic acid; however, other suitable ion-containing monomers, with or without 2-hydroxy methacrylate, cross-linked with poly(ethylene glycol) dimethacrylate, or other suitable cross-linking agents, such as ethylene glycol dimethacrylate or 1,1,1-trimethylolpropane trimethacrylate, or a combination of cross-linking agents may also serve as the ion-containing elastomeric, cross-linked material. Other electroactive materials may also be used as the smart material, such as poly(vinyl alcohol), ionized poly(acrylamide), poly(acrylic acid), poly(acrylic acid)-co-(poly(acrylamide), poly(2-acrylamide-2-methyl-1-propane sulfonic acid), poly(methacrylic acid), poly(styrene sulfonic acid), quarternized poly(4-vinyl pyridinium chloride), and poly(vinylbenzyltrimethyl ammonium chloride), sulfonated poly(styrene-b-ethylene-co-butylene-b-styrene), sulfonated polystyrene, or any material that responds to electricity by movement, expansion, contraction, curling, bending, buckling, or rippling. In the preferred embodiment, conductive electrode 2 and conductive electrode 3 were splayed and were plasma treated to enhance communications with the ion-containing elastomeric, cross-linked material 1. In the preferred embodiment, said conductive leads were attached directly into the ion-containing elastomeric, cross-linked material 1 before polymerization or curing, providing a highly effective method of attaching said conductive electrodes to said electroactive material. The strong bond at the interface of said electrodes and said ion-containing elastomeric, cross-linked material significantly improves the reliability and responsiveness of the electrically driven mechanochemical actuator. Additionally, in the preferred embodiment, covering the outer surface of the ion-containing elastomeric, cross-linked material 1 with one or more coating(s) of a non electrically-conductive, flexible encapsulating coating 4, preferably after coating—the outer surface of the ion-containing elastomeric cross-linked material 1 with an annealing compound, a coupling compound, and/or a lubricant, allows the ion-containing elastomeric, cross-linked material 1 to be free from requiring immersion in an external electrolyte solution, and enables operability in a variety of environments. The described preferred embodiment comprising the ion-containing elastomeric, cross-linked material 1, said embedded electrically conductive electrodes 2 and 3, immersed in electrolyte and sealed with said flexible encapsulating coating 4, has the functionality of an artificial muscle within a protective "skin."

In the preferred embodiment, the preferred composition for electroactive material 1 is methacrylic acid. Other suitable ion-containing monomers, with or without 2-hydroxy methacrylate, cross-linked with poly(ethylene glycol) dimethacrylate, or other suitable cross-linking agents, such as ethylene glycol dimethacrylate or 1,1,1-trimethylolpropane trimethacrylate, or a combination of cross-linking agents are also suitable. These materials are produced using standard free radical polymerization or photo-polymerization methods, preferably in the presence of an electrolytic aqueous solution or gel. Prepolymers can also be used. Cross-linking greatly improves the resilience, toughness, and in some cases, strength, of the electroactive materials. A variety of materials may be used to produce the electroactive material, such as poly(vinyl alcohol), ionized poly(acrylamide), poly(acrylic acid), poly(acrylic acid)-co-(poly(acrylamide), poly(2-acrylamide-2-methyl-1-propane sulfonic acid), poly(methacrylic acid), poly(styrene sulfonic acid), quarternized poly(4-vinyl pyridinium chloride), and poly(vinylbenzyltrimethyl ammonium chloride), sulfonated poly(styrene-b-ethylene-co-butylene-b-styrene), sulfonated polystyrene, or any material that responds to electricity by movement, expansion, such as contraction, curling, bending, buckling, or rippling.

Before, during, or after the polymerization, or curing, of the ion-containing elastomeric, cross-linked material 1, metallic electrodes 2 and 3, or other suitably conductive leads, are placed within ion-containing elastomeric, cross-linked material 1, preferably at two opposing ends. In the preferred embodiment the electrodes are previously plasma treated or etched or otherwise treated, preferably with the ends that are within the smart material splayed into 3 or more fine filaments. These leads preferably do not touch each other. The electrolyte solution or an electrolyte gel formulation, is saturated, or compounded, into the ion-containing elastomeric, cross-linked material 1 before, during, or after the polymerization, or curing, of the smart material. The electrolyte can be a simple salt such as sodium chloride, a lithium salt such as lithium perchlorate, an organic salt such as sodium acetate, or an organo-metallic salt such as lithium methide. The ion-containing elastomeric, cross-linked material 1 is coated with one or a plurality of thin, insulating, elastomeric encapsulating covering(s) 4, which act in essence as a "skin," allowing the configured ion-containing elastomeric, cross-linked material 1 to be operational, even when it is removed from electrolytic solution. The ion-containing elastomeric, cross-linked material 1, is preferably coated with an annealing compound, a coupling compound, or a lubricant, preferably a dry lubricant, or a mixture of these types of compounds prior to encapsulation. First electrode 2 and second electrode 3 are preferably platinum, but may be any suitably conductive material wherein the ends of said electrodes are preferably splayed, First electrode 2 and second electrode 3 are preferable plasma treated or etched or otherwise treated. The splayed, treated ends of said electrodes are then placed into position in a mold, preferably but not necessarily, prior to the polymerization of electroactive material 1. Electroactive material 1 is then allowed, if needed, to absorb electrolytic solution or an electrolytic gel. The preferred composition for the encapsulating coating 4 is any suitable elastomer, such as natural rubber or poly(butadiene), which can be coated, preferably sputter coated, or otherwise encapsulated around electroactive material 1 and the parts of electrodes 2 and 3 protruding from said electroactive material. Electroactive material 1 responds when electricity flowing through first conductive lead 2 and second conductive 3, causes electroactive material 1 to expand, contract, curl, bend, ripple, or buckle. When the flow of electricity ceases, electroactive 1 can relax back to its original conformation.

In the configurations in the present invention, the said electroactive materials act functionally as an artificial muscle, for use in prosthetic or robotic environments and will allow prosthetic and robotic arms to move seamlessly in three-dimensions, and furthermore can have an enormous impact on prosthetics, valves, and automated systems, particularly robotics. Furthermore, in the present invention, the electrically driven mechanochemical actuators may be arranged in fibers, bulk, slabs, or bundles, and may be in mechanical communication with hinge joints, rotational joints, ball-and-socket joints, levers and other types of mechanical mechanisms. The compositions and configurations of the actuators described may be used for prosthetics, robotics, automation, valves, and may find use in many medical applications, industrial applications, and may also find use in toys.

While this invention has been described in terms of two preferred embodiments, there are alterations, permutations, and equivalents that fall within the scope of this invention which have been omitted. For example, although the present invention has been described in terms of two identical similar electrodes, the present invention is not limited to two electrodes having identical shape. As another example, although the present invention has been described as having an oblong shape, the present invention may have other shapes that serve the same function. It is therefore intended that the scope of the invention should not be determined with reference to the appended claims.

I claim:

1. An electrically driven mechanochemical actuator comprising:
an electroactive material capable of converting electrical to mechanical energy; said electroactive material in contact with a first electrode and a second electrode, said electroactive material immersed in an electrolyte solution, said electroactive material and said electrolyte solution surrounded by a flexible encapsulating coating, wherein said electroactive material is in contact with a continuous electrode comprising a plurality of conductive fibers.

2. An electrically driven mechanochemical actuator comprising:
an electroactive material capable of converting electrical to mechanical energy; said electroactive material in contact with a first electrode and a second electrode, said electroactive material immersed in an electrolyte solution, said electroactive material and said electrolyte solution surrounded by a flexible encapsulating coating, wherein a portion of said first electrode and a portion of said second electrode penetrates there through, wherein said actuator is coated with a lubricant before said encapsulating coating is applied.

* * * * *